United States Patent
Ali et al.

(10) Patent No.: US 12,513,085 B1
(45) Date of Patent: Dec. 30, 2025

(54) END TO END DRIFT DETECTION IN LARGE SCALABLE NETWORKS

(71) Applicant: Dell Products L.P., Round Rock, TX (US)

(72) Inventors: Rizwan Ali, Cedar Park, TX (US); Dharmesh M. Patel, Round Rock, TX (US); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 18/756,213

(22) Filed: Jun. 27, 2024

(51) Int. Cl.
| | |
|---|---|
| *H04L 29/08* | (2006.01) |
| *H04L 12/24* | (2006.01) |
| *H04L 41/0816* | (2022.01) |
| *H04L 41/22* | (2022.01) |
| *H04L 43/50* | (2022.01) |
| *H04L 47/125* | (2022.01) |
| *H04L 67/10* | (2022.01) |

(52) U.S. Cl.
CPC ........ *H04L 47/125* (2013.01); *H04L 41/0816* (2013.01); *H04L 43/50* (2013.01)

(58) Field of Classification Search
CPC ... H04L 47/125; H04L 41/0816; H04L 43/50; H04L 29/08; H04L 12/24; H04L 41/22; H04L 67/10
USPC .......................................................... 709/224
See application file for complete search history.

(56) References Cited

U.S. PATENT DOCUMENTS

| | | | |
|---|---|---|---|
| 10,791,168 B1 * | 9/2020 | Dilley | H04L 41/22 |
| 12,135,629 B2 * | 11/2024 | Patel | G06F 9/5044 |
| 2024/0388100 A1 * | 11/2024 | Wong | H02J 3/381 |

* cited by examiner

*Primary Examiner* — Jude Jean Gilles
(74) *Attorney, Agent, or Firm* — WOMBLE BOND DICKINSON (US) LLP (57) ABSTRACT

Methods, systems, and devices for managing operation of a data processing system that provides computer implemented services are disclosed. To do so, a request to perform a workload may be obtained. A type of the workload may be identified based on the request, and based on this type, computing resources required for performance of the workload may be identified. Potential locations for the performance of the workload may be filtered based on the required computing resources to identify a portion of the potential locations. Based on associations between types of workloads and sets of network characteristics, a set of network characteristics may be identified for the type. Based on the set of network characteristics, the potential locations may be further filtered to identify a sub-portion of the potential locations. Based on this identification, performance of the workload by at least one data processing system of the sub-portion may be initiated.

20 Claims, 5 Drawing Sheets

END TO END DRIFT DETECTION IN LARGE SCALABLE NETWORKS

FIELD

Embodiments disclosed herein relate generally to management of data processing systems. More particularly, embodiments disclosed herein relate to systems and methods for managing operations of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operations of data processing systems that may provide, at least in part, computer implemented services. The computer implemented services may be provided to any type and/or number of other devices and/or users of the data processing systems. Furthermore, the provided computer implemented services may be of any quantity and/or type of such services.

To provide the computer implemented services, data processing systems may include multiple hardware components. For example, parallel operation of multiple hardware components may facilitate various functionalities of a data processing system, thereby causing the data processing system to provide the computer implemented services.

However, based on a network topology of the data processing systems, a number of the operable connections, and/or a versatility of any one of the operable connections, may be limited. Such limits on the operable connections' usability may impair the ability of the multiple hardware components to contribute to the computer implemented services. Consequently, the computer implemented services may be negatively impacted by the multiple hardware components impaired ability to contribute to the computer implemented services.

To mitigate impairment of the multiple hardware components, and thus, mitigate negative impacts on the computer implemented services, a workload manager may select locations based on resource availability and network connectivity. These locations may be selected to perform workloads that in turn cause the computer implemented services to be provided.

In an embodiment, a method for managing operation of a data processing system that provides computer implemented services is provided.

The method may include obtaining a request to perform a workload; identifying, based on the request, a type of the workload; identifying, based on the type of the workload, computing resources required for performance of the workload; filtering, based on the required computing resources, potential locations for performance of the workload to identify a portion of the potential locations; identifying, based on the type of the workload and associations between types of workloads and sets of network characteristics, a set of network characteristics of the sets of the network characteristics; filtering, based on the set of the network characteristics, the portion of the potential locations to identify a sub-portion of the potential locations; and initiating, based on the sub-portion of the potential locations, performance of the workload by at least one data processing system of the sub-portion of the potential locations.

The sub-portion of the potential locations may include multiple data processing systems operably connected to one another as defined by the set of network characteristics.

The workload may be an artificial intelligence workload, and the type of the workload may be based on an enumerated number of lifecycle phases of artificial intelligence workloads, the enumerated number of phases including: a training phase; an inferencing phase; and an updating phase.

The set of network characteristics may include a network topology that indicates connectivity between a set of data processing systems; and a network configuration for the network topology that indicates network data unit forwarding behavior for the set of data processing systems.

The associations between types of workloads and sets of network characteristic may be based on test workloads performed by a second set of data processing systems subject to different sets of network characteristics when each of the test workloads is performed.

A test workload of the test workloads may be of the type of the workload, and an association of the associations may be based on the type and a set of network characteristics of the different sets of network characteristics when the second set of data processing systems performed the test workload.

A first potential location of the potential locations may be a first data processing system hosting a first graphics processing unit and a second potential location of the potential locations may be a second data processing system hosting a second graphics processing unit.

In an embodiment, a non-transitory media is provided. The non-transitory media may include instructions that when executed by a processor cause, at least in part, the computer-implemented method to be performed.

In an embodiment, a data processing system is provided. The data processing system may include the non-transitory media and a processor and may, at least in part, perform the method when the computer instructions are executed by the processor.

Figure 1:
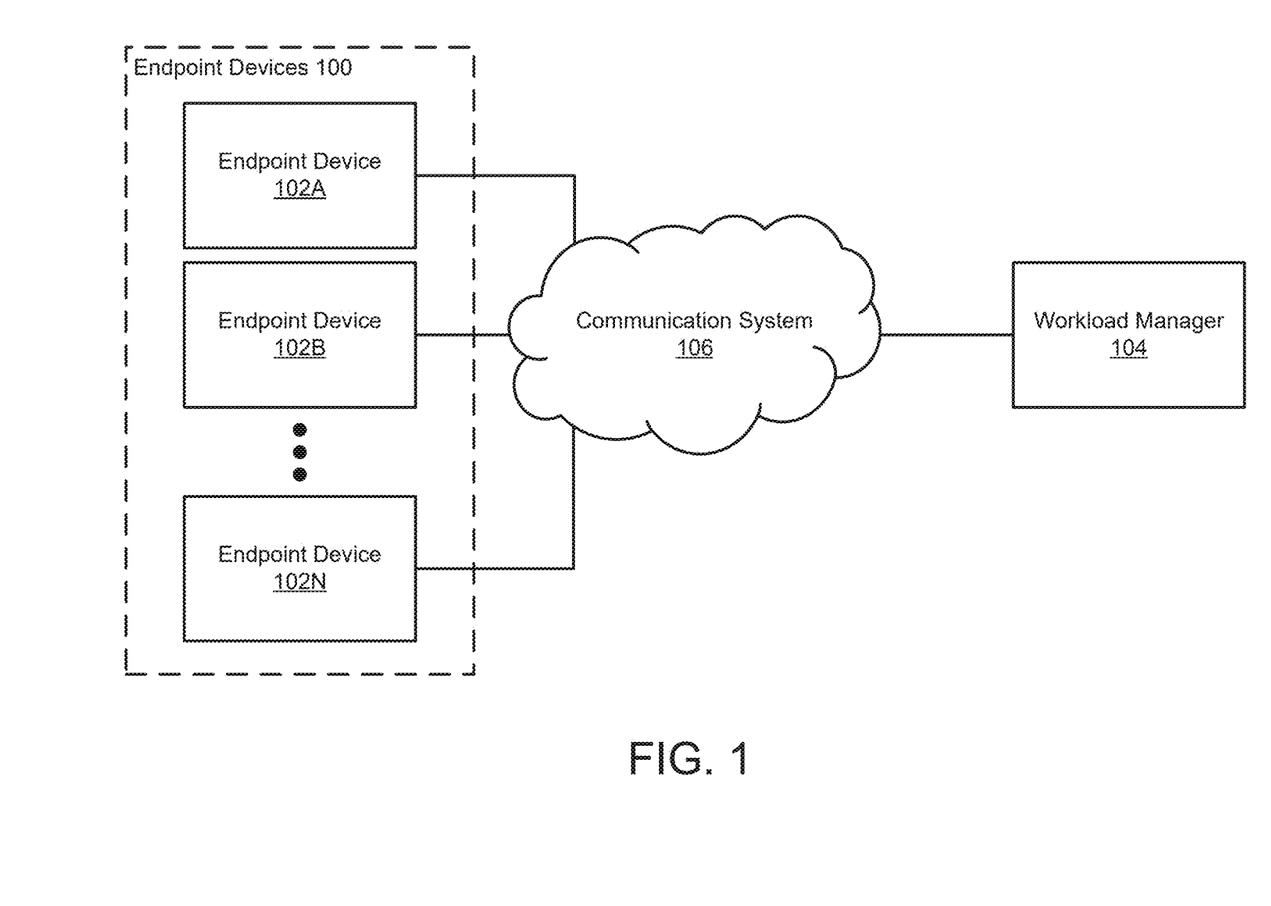
FIG. 1 shows a block diagram illustrating a system in accordance with an embodiment.

Turning to FIG. 1, a block diagram illustrating a system in accordance with an embodiment is shown. The system shown in FIG. 1 may be a distributed system that provides for management of data processing systems that may provide, at least in part, computer implemented services.

The computer implemented services may include any type and quantity of computer implemented services. The computer implemented services may include, for example, database services, data processing services, electronic communication services, artificial intelligence enhanced services (e.g., services that i) depend on outputs provided by inference models that are based on and/or limited by machine learning algorithms, ii) training of such inference models, and/or iii) updating of such inference models), and/or any other services that may be provided using one or more computing devices. The computer implemented services may be provided by, for example, any portion of endpoint devices 100 (e.g., 102A-102N), workload manager 104, communication system 106, and/or any other type of devices (not shown in FIG. 1).

Other types of computer implemented services may be provided by the system shown in FIG. 1 without departing from embodiments disclosed herein.

To provide the computer implemented services, data processing systems may include multiple hardware components. For example, parallel operation of multiple hardware components may facilitate various functionalities of a data processing system, thereby causing the data processing system to provide the computer implemented services.

To facilitate the various functionalities, the multiple hardware components may transmit data between one another via various avenues of communication. For example, such avenues of communication may depend on physical operable connections that directly and/or indirectly connect the multiple hardware components to one another.

However, based on a network topology of the data processing system, a number of the operable connections, and/or a versatility of any one of the operable connections, may be limited. Such limits on the operable connections' usability may impair the ability of the hardware components to contribute to the computer implemented services. Consequently, the computer implemented services may be negatively impacted by the hardware components impaired ability to contribute to the computer implemented services.

In general, embodiments disclosed herein relate to systems, devices, and methods for decreasing a likelihood of negatively impacting the computer implemented services. To do so, locations for workloads may be selected based on resource availability and network connectivity. By doing so, hardware components at selected locations may be less likely to be impaired by the network connectivity of the locations. Consequently, the computer implemented services may be less likely to be negatively impaired by network connectivity.

To provide the above noted functionality, the system of FIG. 1 may include endpoint devices 100 (endpoint device 102A-102N), workload manager 104, and communication system 106. Each of which is discussed below.

Endpoint devices 100 may include any number of endpoint devices (e.g., 102A-102N). Any endpoint device of endpoint devices 100 may provide, at least in part, computer implemented services. To do so, any of endpoint devices 100 may perform workloads. A workload of the workloads may be performed, for example, based on obtaining a request to perform the workload from a user (e.g., a client), and/or other entities. Performance of the workload may depend on (i) resource availability and (ii) network connectivity, each of these being identified and utilized by workload manager 104 to obtain a location for optimal performance of the workload, discussed below.

It will be appreciated that the optimal performance of the workload is to be associated with predictable outcomes of data processing systems, an absence of impaired processes and/or impaired devices impacting the computer implemented services. For example, requesting a workload for performance of instant messaging services may have a predictable outcome where communications are transmitted between at least two devices nearly instantaneously. Therefore, should the outcome instead be a transmission that is delayed, and/or never received by a second device from a first device, then the performance of the workload may be considered less than optimal.

Workload manager 104 may perform operations for managing workloads to be performed by data processing systems (e.g., any of endpoint devices 100). To manage a workload, workload manager 104 may identify a location for performance of the workload at which a hardware component's contribution to the performance of the workload is less likely to be impaired, for example, by limitations associated with network connectivity.

To do so, (i) devices capable of performing the workload (e.g., based on having physical hardware necessary to do so, such as a power supply to power processing, etc.) may be identified, and (ii) a set of network characteristics for a data processing system expected to yield optimal performance of the workload may be obtained.

To obtain the set of network characteristics that when used may thereby increase a likelihood of facilitating optimal performance of the workload, optimization testing may be performed based on the workload for each set from a number of sets of network characteristics. For additional information regarding this optimization testing, refer to FIG. 2A.

Workload manager 104 may, based on the identified devices and the set of network characteristics, discriminated potential locations from one another (e.g., via a filtering process) to obtain (i) a portion of the potential locations, and then (ii) a sub-portion of the potential locations, the sub-portion being another portion of the portion. The sub-portion obtained may thus have an increased likelihood of facilitating optimal performance of the workload.

Based on the sub-portion, workload manager 104 may initiate performance (e.g., the optimal performance) of the workload by at least one data processing system of the sub-portion of the potential locations.

Figure 2A:
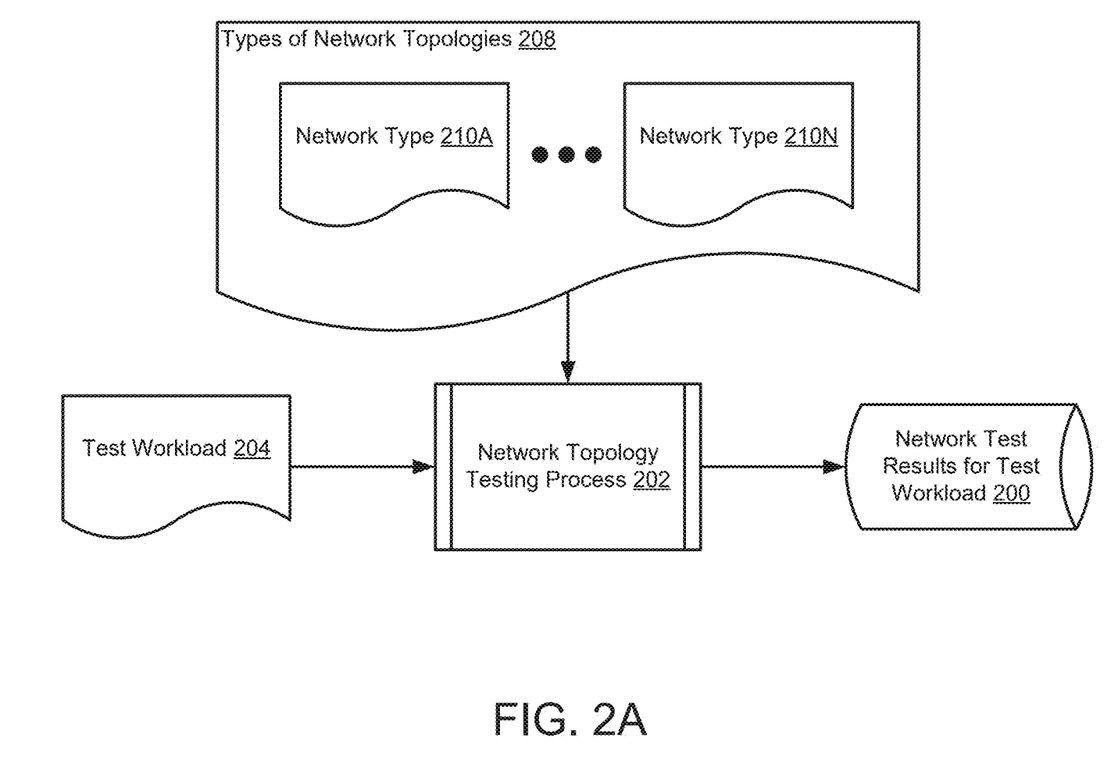
FIGS. 2A-2B show data flow diagrams illustrating methods for managing operation of a data processing system in accordance with an embodiment.
Figure 2B:
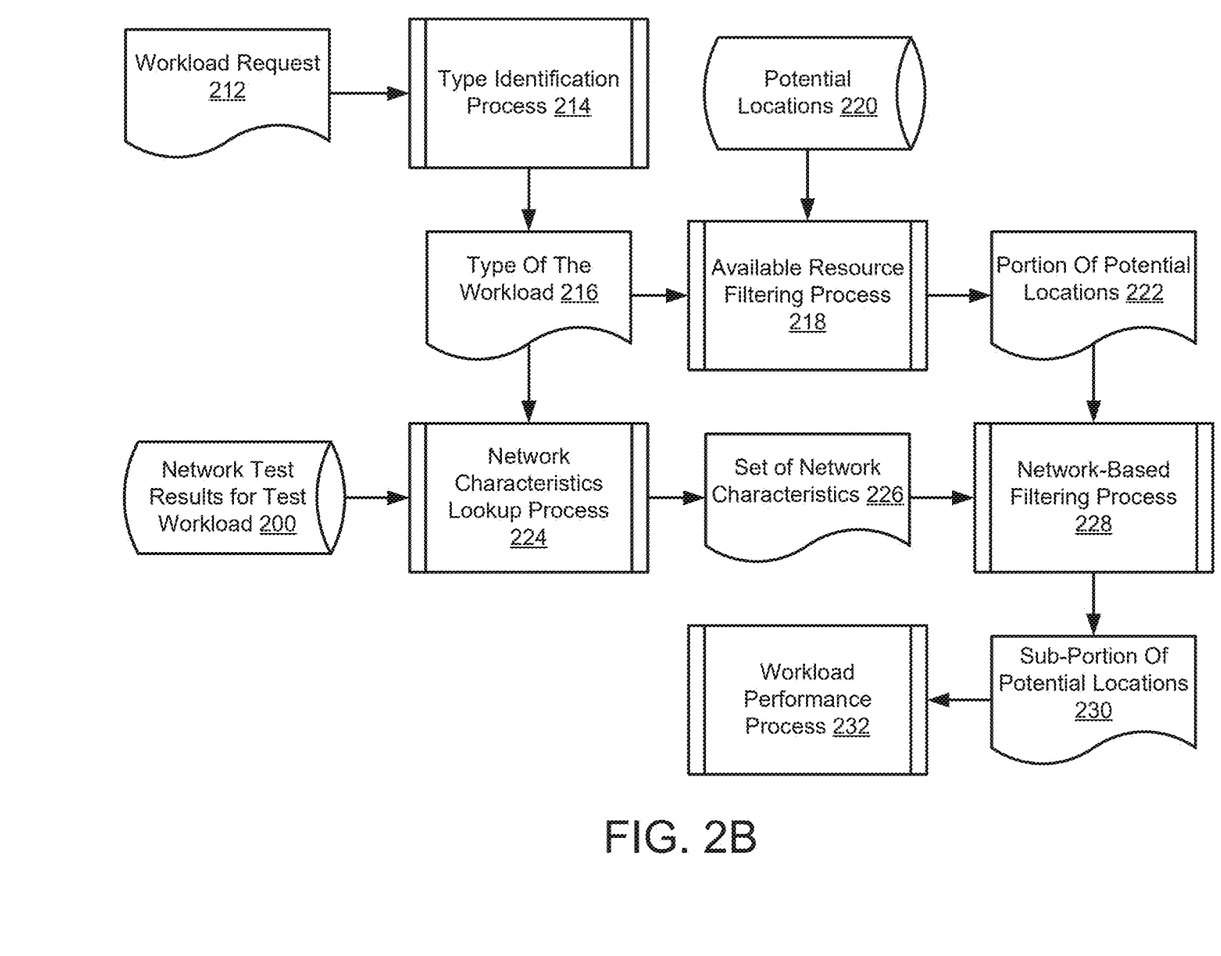

For additional information regarding the potential locations and how the identified devices and set of network characteristics may be used to discriminate between the potential locations, refer to FIG. 2B.

Figure 3:
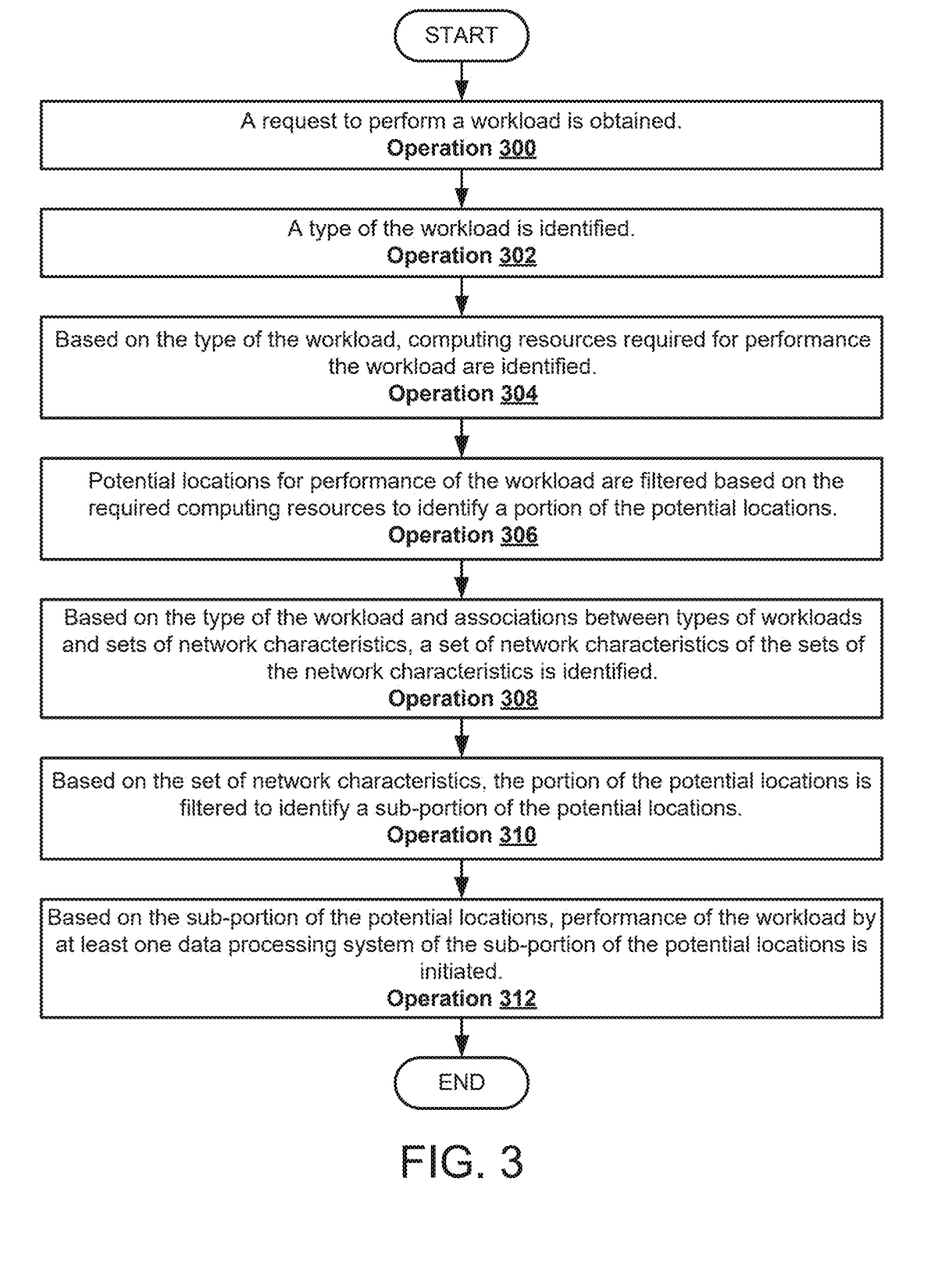
FIG. 3 shows a flow diagram illustrating a method for managing operation of a data processing system in accordance with an embodiment.

When providing their functionality, any endpoint device (e.g., 102A-102N) included in endpoint devices 100 and/or workload manager 104 may perform all, or a portion, of the method shown in FIG. 3.

Any of (and/or components thereof) these endpoint devices and/or workload manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 204, 208, 210A-210N, etc.) is used to represent data structures, a second set of shapes (e.g., 202, 214, etc.) is used to represent processes performed using and/or that generate data, and a third set of shapes (e.g., 200, 220, etc.) is used to represent large scale data structures such as databases.

Additionally, it will be appreciated that within these sets of shapes, (e.g., the first set of shapes), a first portion (e.g., 204, 208, 212, etc.), for example, of the first set of shapes, may represent data which has yet to be obtained (e.g., and therefore, yet to be structured into a usable format) by the data processing system. A second portion (e.g., 216, 226, etc.), for example, of the first set of shapes, may represent data structures in usable format. Additionally, in some cases, some of the second portion may be based on some of the first portion. For example, network test results for test workload 200 may be based on test workload 204, discussed below with regard to FIG. 2A.

Turning to FIG. 2A, a first data flow diagram in accordance with an embodiment is shown. The first data flow diagram may illustrate data used in, and data processing performed in, optimization testing to obtain the set of network characteristics mentioned with regard to FIG. 1.

To obtain the set of network characteristics, network topology testing process 202 may be performed to establish expectations for performance of a workload.

During network topology testing process 202, and as seen in FIG. 2A, (i) test workload 204 may be ingested into network topology testing process 202 based on a request to perform the workload, (ii) data structures specifying various network combinations (e.g., different combinations of network topology and network configurations that indicate network data unit forwarding behavior for respective network topologies) such as sets of network characteristics 208 (e.g., network set 210A-210N) may also be, at least in part, ingested into network topology testing process 202, and (iii) network test results for test workload 204 may be outputted based on any and/or all data ingested into network topology testing process 202. Each of these ingested and/or outputted data structures is discussed below.

Test workload 204 may be a version of the requested workload (e.g., a copy of the requested workload for testing purposes) that is, and/or may otherwise be representative of the requested workload by being, of a (e.g., same) type of the requested workload. For example, assume the requested workload is an artificial intelligence workload. The requested workload may then be of a type that is based on an enumerated number of lifecycle phases of artificial intelligence workloads. This enumerated number of phases may include a training phase, an inferencing phase, and an updating phase. Therefore, if the requested workload is, for example, in a training phase, test workload 204 may also be in the training phase, and thus, also be of the (e.g., same) type of the requested workload.

Sets of network characteristics 208 may be sets of data that define respective network combinations via which the requested workload may be performed. Different network combinations (e.g., different sets of network characteristics) may yield different results based on a functional network connectivity of the performance of the requested workload.

To perform network topology testing process 202, test workload 204 may be performed in various iterations. For example, a single set of network characteristics (e.g., network set 210A-210N) from sets of network characteristics 208 may be used per iteration to yield a respective performance result, each iteration using a different set of network characteristics than the other iterations. Completion of all the iterations may therefore yield respective performance results for each set. Each respective performance result may therefore be recorded, for example, in a database to obtain network results for test workload 200.

By recording results from these iterations during which test workload 204 is performed, the optimization testing may be concluded. Based on the recorded results, associations may be established between types of workloads (e.g., the type) and different sets of network characteristics. For example, the associations may indicate which set of network characteristics of sets of network characteristics 208 is most conducive (e.g., compared to the other sets) to optimal performance of the requested workload. For example, the set of network characteristics mentioned with regard to FIG. 1 may be the most conducive.

Additionally, the associations may indicate a hierarchy (e.g., based on a degree of the conduciveness) of network combinations with regard to the optimal performance of the requested workload. For example, the set of network characteristics mentioned with regard to FIG. 1 may be ranked at a top of the hierarchy. Each set of characteristics may be ranked following the set of characteristics mentioned with regard to FIG. 1 based on a next highest degree of conduciveness from a those already ranked. This ranking may end, for example, when the lowest degree of the conduciveness is ranked.

Thus, upon conclusion of the optimization testing, expected performance results for the requested workload may be established and the set of network characteristics mentioned with respect to FIG. 1 may be obtained.

As noted previously, a location may be identified out of a number of optional locations for performance of the requested workload. This identification may utilize the expected performance results for the requested workload, discussed above with regard to FIG. 2A, and discussed further below with respect to FIG. 2B. In doing so, limitations associated with, for example, network connectivity may be less likely to cause impairment of the requested workload.

Turning to FIG. 2B, a second data flow diagram in accordance with an embodiment is shown. The second data flow diagram may illustrate data used in, and data processing performed in, identifying a location for performance of the requested workload based on resource availability and network connectivity.

As seen in FIG. 2B, to identify the location, a number of processes may be performed to discriminate optional locations from one another based on the type discussed with respect to FIG. 2A.

To obtain the type, type identification process 214 may be performed. During type identification process 214, (i) workload request 212 may be ingested into type identification process 214, and (ii) type of the workload 216 may be outputted based on any and/or all data ingested into type identification process 214.

Workload request 212 may include the requested workload discussed with regard to FIG. 2A, and any information that may be relevant for performing the requested workload. For example, workload request 212 may include a workload and information indicating that the workload is an artificial intelligence workload that is in a training phase within its lifecycle. Therefore, by ingesting workload request 212 into type identification process 214, the information indicative of this training phase may be identified and allow the type of the workload (e.g., 216) to be determined based on the identification of such information. For example, based on the training phase of the requested workload, type of the workload 216 may be of the (e.g., same) type discussed with respect to the test workload in FIG. 2A.

Based on type of the workload 216, a number of potential locations (e.g., from potential locations 220) that may facilitate performance of the requested workload may be, for example, filtered. Such locations may be implemented as a group of data processing systems, a single data processing system, a data processing unit, etc.

Therefore, to filter potential locations 220, available resource filtering process 218 may be performed. During available resource filtering process 218, (i) type of the workload 216 may be ingested into available resource filtering process 218, (ii) at least a portion of potential locations 220 may be ingested into available resource filtering process 218, and (iii) portion of potential locations 222 may be outputted based on any and/or all data ingested into available resource filtering process 218.

To perform available resource filtering process 218, type of the workload 216 may be used to identify computing resources required to perform the requested workload. To do so, for example, a lookup may be performed in a database that relates the types of workloads with computer resource consumption. For example, this database may be an accumulation of observed data from past workload management processes.

Therefore, by using processes such as the aforementioned lookup, the computing resources required to perform the requested workload may be identified. For example, the type that is based on the training phase may require a large amount of power (e.g., compared to types based on the inferencing phase and/or the updating phase). Based on this power requirement, a portion of the potential locations may be identified based on having access to a high output power supply unit. Additionally, for example, a workload of this type may require a high degree of processing ability, thereby causing discrimination between potential locations to isolate the portion with access to processors with more cores and/or generally higher speeds of processing.

By filtering the potential locations based on computing resource requirements, portion of potential locations 222 may be obtained. For example, portion of potential locations 222 may include only some of the potential locations, or parts thereof, that have access to a high output power supply and access to processors with more cores and/or generally higher speeds of processing.

The potential locations may be further filtered (e.g., portion of potential locations 222 may be filtered) based on network connectivity and limitations thereof. To do so, however, a set of network characteristics that are most conducive (e.g., compared to other sets of network characteristics) to optimal performance of the requested workload may be obtained.

To obtain the set of network characteristics (e.g., 226), network characteristic identification process 224 may be performed. During network characteristic identification process 224, (i) type of the workload 216 may be ingested into network characteristic identification process 224, (ii) network test results for test workload 200 (discussed in FIG. 2A) may be ingested into network characteristic identification process 224, and (iii) set of network characteristic 226 may be outputted based on any and/or all data ingested into network characteristic identification process 224. Refer back to FIG. 2A for information regarding network test results for test workload 200.

To perform network characteristic identification process 224, for example, and assuming the hierarchy of network test results for test workload 200 is as discussed in FIG. 2A, the set of network characteristics that are most conducive to the optimal performance (e.g., the first ranked set of network characteristics) may be identified and obtained for further use.

However, in some cases, portion of potential locations 222 may not include any locations with the set of network characteristics. Therefore, it will be appreciated that set of network characteristics 226 may include any number of sets of network characteristics and each of the any number of sets may be associated with the hierarchy. For example, each set of the any number of sets may have reference to a respective degree of the conduciveness differentiating one another in the hierarchy. For example, a group of a top ranked five sets of network characteristics may be included in set of network characteristics 226. Therefore, if portion of potential locations 222 does not have the first ranked set, the following ranks may be used in turn until a highest possible ranked set of network characteristics is available for use by any of portion of potential locations 222.

It will further be appreciated that, in some cases, network characteristic identification process 224 may include the optimization testing as discussed in FIG. 2A, and may, rather than ingest (as seen in FIG. 2B), output network test results for test workload 200 with the set of network characteristics included.

Once set of network characteristics 226 is obtained, the potential locations may be further filtered as previously mentioned. To further filter the potential locations, network-based filtering process 228 may be performed.

During network-based filtering process 228, (i) set of network characteristics 226 may be ingested into network-based filtering process 228, (ii) portion of potential locations 222 may be ingested into network-based filtering process 228, and (iii) sub-portion of potential locations 230 may be outputted based on any and/or all data ingested into network-based filtering process 228.

To perform network-based filtering process 228, for example, the portion of the potential locations may be searched for a location (e.g., a sub-portion of the potential locations) capable of implementing the set of network characteristics. To do so, network topologies of the set of network characteristics may be searched for within the portion. If identified as having the network topologies, a determination may be made regarding whether the network topologies of the sub-portion are capable of implementing network configurations associated with the network topologies as specified by the set of network characteristics. If a location within the portion is determined to support the set of network characteristics, the sub-portion may be obtained as sub-portion of potential locations 230.

It will be appreciated that sub-portion of potential locations 230 may include any number of sub-portions, and that the network-based filtering is based on a highest ranking set of network characteristics from the hierarchy present anywhere in the portion.

Thus, the sub-portion of the potential locations may be obtained and used to initiate performance of the requested workload by, for example, being ingested into workload performance process 232. To do so, the requested workload may be scheduled for performance by, for example, a data processing unit of the sub-portion.

By performing the optimization testing discussed in FIG. 2A and filtering potential locations based on results from the optimization testing, as discussed in FIG. 2B, operation of data processing systems may be managed based on resource availability and network connectivity. In doing so, hardware components at locations such as a location included in the sub-portion may be less likely to be impaired by, for example, limitations in network connectivity. A decreased likelihood of impairment may in turn increase a likelihood of performing the requested workload optimally and thus, may increase the likelihood of providing the computer implemented services.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

While illustrated in FIGS. 2A-2B with a limited number of specific components, a system may include additional, fewer, and/or different components without departing from embodiments disclosed herein.

As discussed above, the components of FIG. 1 may perform various methods to manage data processing systems. FIG. 3 illustrates methods that may be performed by the components of FIG. 1.

In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing operation of a data processing system in accordance with an embodiment is shown. The method may be performed, for example, by a workload manager (e.g., 104) and/or any other entity.

At operation 300, a request to perform a workload is obtained. The request may be obtained by (i) receiving the request via communication transmissions from another device (e.g., a data processing system), (ii) retrieving data indicating occurrence of the request from local storage of a data processing system, (iii) generating the request based on interactions of the data processing system, and/or (iv) obtain this data via other processes.

At operation 302, a type of the workload is identified. The type may be identified by identifying processes specified by the workload to be performed. For example, assume the workload is an artificial intelligence workload in a training lifecycle phase. This workload may specify performance of processes associated with ingesting large quantities of data for the purpose of training an inference model to make certain types of predictions based on the data ingested. Thus, by identifying these specified processes, the type of the workload may be identified (e.g., a type based on the training phase).

At operation 304, based on the type of the workload, computing resources required for performance of the workload are identified. These computing resources may be identified by, for example, using general and/or average resource consumption information obtained based on performances of different types of workloads. For example, a lookup may be performed of such information using an identifier for the type of the workload. The identifier may therefore be used to identify resource consumption information associated with the type of the workload, and thus, return the computing resources required. For example, the lookup may return a requirement for a power supply unit of at least 600 watts.

At operation 306, potential locations for performance of the workload are filtered based on the required computing resources to identify a portion of the potential locations. These potential locations may be filtered by performing an inventory check for data processing systems of the potential locations, returning identifications of hardware components with resource specifications equal to or greater than the computing resources required. For example, assuming the requirement for the power supply unit of at least 600 watts, assume power supply units of 300 watts, 550 watts, and 800 watts are available to the three data processing systems, respectively. In this case, identification of only the power supply unit of 800 watts may be returned along with the third data processing system with which it is located (e.g., the third data processing system being a portion of the potential locations).

At operation 308, based on the type of the workload and associations between types of workloads and sets of network characteristics, a set of network characteristics of the sets of network characteristics is identified. The set of network characteristics may be identified by performing optimization testing as discussed with regard to FIG. 2A.

For example, various iterations of a test workload may be performed. Each of these iterations may include performance via a different set of network characteristics and the test workload may be representative of the requested workload (e.g., by being of the same type as the workload). Therefore, once each iteration has been completed, information associated with each performance may be obtained. This information may include, for example, a duration of time for each respective performance. Thus, an optimal set of network characteristics (e.g., optimal for performance speed) may be identified from the iterations by identifying which of the iterations is performed faster than the other iterations.

At operation 310, based on the set of network characteristics, the portion of the potential locations is filtered to identify a sub-portion of the potential locations. The portion may be filtered by, for example, checking which locations of the portion of potential locations is capable of being performed via the set of network characteristics.

For example, assume that the third data processing system has a central processing unit (CPU) and two graphical processing units (GPUs) (e.g., a first and second GPU). Further assume that only the second GPU is capable of performing the requested workload via the set of network characteristics. Therefore, this filtering may result in the identification of the second GPU being the sub-portion of the potential locations.

At operation 312, based on the sub-portion of the potential locations, performance of the workload by at least one data processing system of the sub-portion of the potential locations is initiated. The performance may be initiated by scheduling the workload to be performed by the at least one data processing system. For example, the second GPU may be scheduled to perform the requested workload after being identified as the sub-portion of the potential locations.

The method may end following operation 312.

Thus, using the method illustrated in FIG. 3, embodiments disclosed herein may manage data processing systems to select locations for performance of workloads based on resource availability and network connectivity. In doing so, a likelihood of negatively impacting computer implemented services provided by the data processing systems performing the workloads may be decreased.

Figure 4:
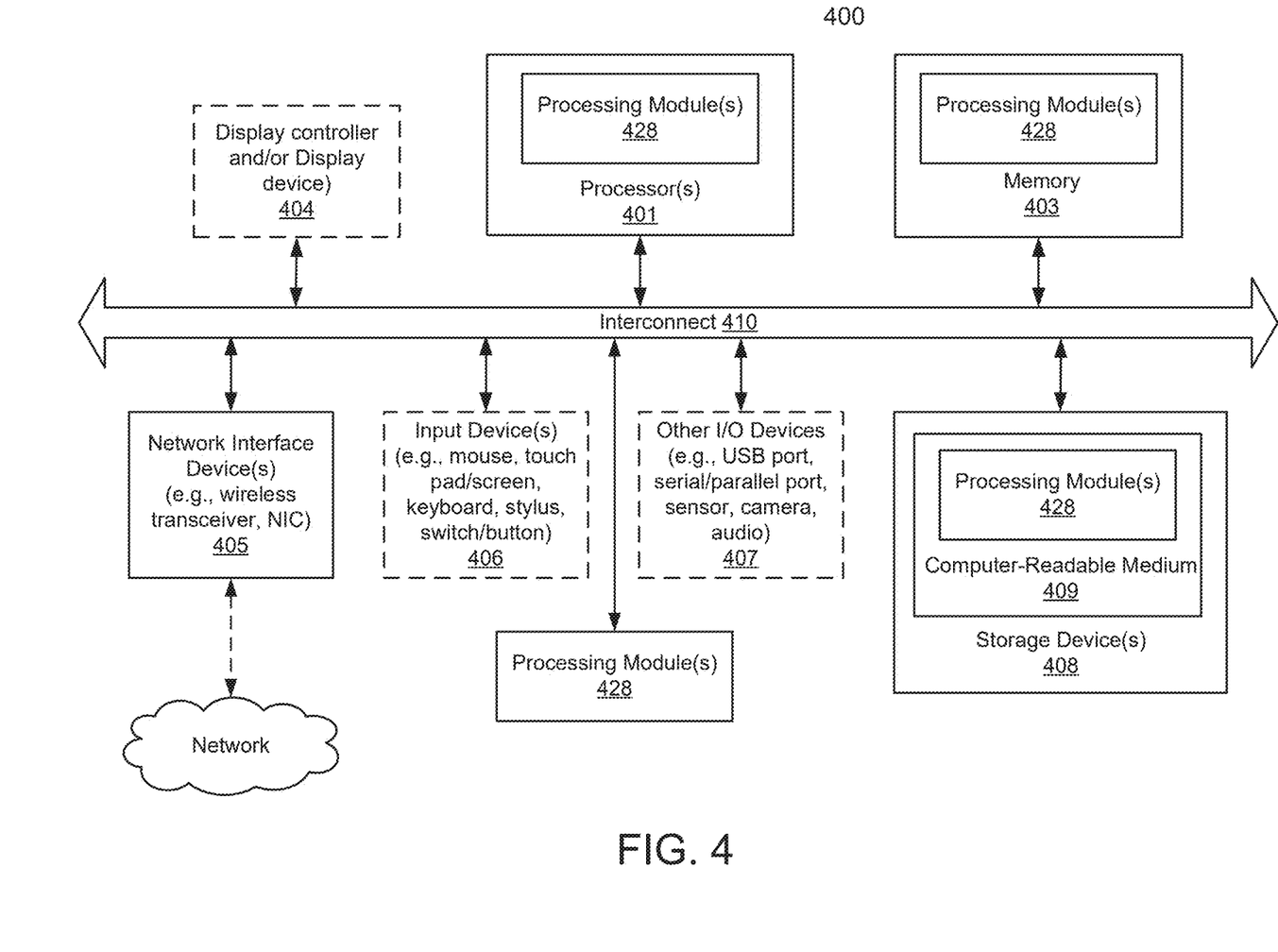
FIG. 4 shows a block diagram illustrating a data processing system in accordance with an embodiment.

The aforementioned method, and components described with respect to FIGS. 1-3, may be used with a data processing system to facilitate cooling of components of the data processing system. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system that provides computer implemented services, the method comprising:
   obtaining a request to perform a workload;
   identifying, based on the request, a type of the workload;
   identifying, based on the type of the workload, computing resources required for performance of the workload;
   filtering, based on the required computing resources, potential locations for performance of the workload to identify a portion of the potential locations;
   identifying, based on the type of the workload and associations between types of workloads and sets of network characteristics, a set of network characteristics of the sets of the network characteristics;
   filtering, based on the set of the network characteristics, the portion of the potential locations to identify a sub-portion of the potential locations; and
   initiating, based on the sub-portion of the potential locations, performance of the workload by at least one data processing system of the sub-portion of the potential locations.

2. The method of claim 1, wherein the sub-portion of the potential locations comprises multiple data processing systems operably connected to one another as defined by the set of network characteristics.

3. The method of claim 1, wherein the workload is an artificial intelligence workload, and the type of the workload is based on an enumerated number of lifecycle phases of artificial intelligence workloads, the enumerated number of phases comprising:
   a training phase;
   an inferencing phase; and
   an updating phase.

4. The method of claim 1, wherein the set of network characteristics comprises:
   a network topology that indicates connectivity between a set of data processing systems; and
   a network configuration for the network topology that indicates network data unit forwarding behavior for the set of data processing systems.

5. The method of claim 1, wherein the associations between types of workloads and sets of network characteristic are based on test workloads performed by a second set of data processing systems subject to different sets of network characteristics when each of the test workloads is performed.

6. The method of claim 5, wherein a test workload of the test workloads is of the type of the workload, and an association of the associations is based on the type and a set of network characteristics of the different sets of network characteristics when the second set of data processing systems performed the test workload.

7. The method of claim 1, wherein a first potential location of the potential locations is a first data processing system hosting a first graphics processing unit and a second potential location of the potential locations is a second data processing system hosting a second graphics processing unit.

8. A non-transitory machine-readable medium having instructions stored therein, which when executed by a processor, cause the processor to perform operations for managing operation of a data processing system that provides computer implemented services, the operations comprising:
   obtaining a request to perform a workload;
   identifying, based on the request, a type of the workload;
   identifying, based on the type of the workload, computing resources required for performance of the workload;
   filtering, based on the required computing resources, potential locations for performance of the workload to identify a portion of the potential locations;
   identifying, based on the type of the workload and associations between types of workloads and sets of network characteristics, a set of network characteristics of the sets of the network characteristics;
   filtering, based on the set of the network characteristics, the portion of the potential locations to identify a sub-portion of the potential locations; and
   initiating, based on the sub-portion of the potential locations, performance of the workload by at least one data processing system of the sub-portion of the potential locations.

9. The non-transitory machine-readable medium of claim 8, wherein the sub-portion of the potential locations comprises multiple data processing systems operably connected to one another as defined by the set of network characteristics.

10. The non-transitory machine-readable medium of claim 8, wherein the workload is an artificial intelligence workload, and the type of the workload is based on an enumerated number of lifecycle phases of artificial intelligence workloads, the enumerated number of phases comprising:
    a training phase;
    an inferencing phase; and
    an updating phase.

11. The non-transitory machine-readable medium of claim 8, wherein the set of network characteristics comprises:
- a network topology that indicates connectivity between a set of data processing systems; and
- a network configuration for the network topology that indicates network data unit forwarding behavior for the set of data processing systems.

12. The non-transitory machine-readable medium of claim 8, wherein the associations between types of workloads and sets of network characteristic are based on test workloads performed by a second set of data processing systems subject to different sets of network characteristics when each of the test workloads is performed.

13. The non-transitory machine-readable medium of claim 12, wherein a test workload of the test workloads is of the type of the workload, and an association of the associations is based on the type and a set of network characteristics of the different sets of network characteristics when the second set of data processing systems performed the test workload.

14. The non-transitory machine-readable medium of claim 8, wherein a first potential location of the potential locations is a first data processing system hosting a first graphics processing unit and a second potential location of the potential locations is a second data processing system hosting a second graphics processing unit.

15. A system, comprising:
- a processor; and
- a memory coupled to the processor to store instructions, which when executed by the processor, cause the processor to perform operations for managing operation of a data processing system that provides computer implemented services, the operations comprising:
  - obtaining a request to perform a workload;
  - identifying, based on the request, a type of the workload;
  - identifying, based on the type of the workload, computing resources required for performance of the workload;
  - filtering, based on the required computing resources, potential locations for performance of the workload to identify a portion of the potential locations;
  - identifying, based on the type of the workload and associations between types of workloads and sets of network characteristics, a set of network characteristics of the sets of the network characteristics;
  - filtering, based on the set of the network characteristics, the portion of the potential locations to identify a sub-portion of the potential locations; and
  - initiating, based on the sub-portion of the potential locations, performance of the workload by at least one data processing system of the sub-portion of the potential locations.

16. The system of claim 15, wherein the sub-portion of the potential locations comprises multiple data processing systems operably connected to one another as defined by the set of network characteristics.

17. The system of claim 15, wherein the workload is an artificial intelligence workload, and the type of the workload is based on an enumerated number of lifecycle phases of artificial intelligence workloads, the enumerated number of phases comprising:
- a training phase;
- an inferencing phase; and
- an updating phase.

18. The system of claim 15, wherein the set of network characteristics comprises:
- a network topology that indicates connectivity between a set of data processing systems; and
- a network configuration for the network topology that indicates network data unit forwarding behavior for the set of data processing systems.

19. The system of claim 15, wherein the associations between types of workloads and sets of network characteristic are based on test workloads performed by a second set of data processing systems subject to different sets of network characteristics when each of the test workloads is performed.

20. The system of claim 19, wherein a test workload of the test workloads is of the type of the workload, and an association of the associations is based on the type and a set of network characteristics of the different sets of network characteristics when the second set of data processing systems performed the test workload.

* * * * *